US010727920B2

(12) United States Patent
Wei et al.

(10) Patent No.: US 10,727,920 B2
(45) Date of Patent: Jul. 28, 2020

(54) DYNAMIC CSI-RS TRANSMISSION FOR ENHANCED FD-MIMO

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/085,498

(22) PCT Filed: Apr. 27, 2017

(86) PCT No.: PCT/CN2017/082223
§ 371 (c)(1),
(2) Date: Sep. 14, 2018

(87) PCT Pub. No.: WO2017/190626
PCT Pub. Date: Nov. 9, 2017

(65) Prior Publication Data
US 2019/0089436 A1  Mar. 21, 2019

(30) Foreign Application Priority Data

May 3, 2016 (WO) .............. PCT/CN2016/080889

(51) Int. Cl.
H04B 7/06 (2006.01)
H04L 5/00 (2006.01)
(Continued)

(52) U.S. Cl.
CPC ......... *H04B 7/0626* (2013.01); *H04B 7/0456* (2013.01); *H04B 7/0639* (2013.01);
(Continued)

(58) Field of Classification Search
None
See application file for complete search history.

(56) References Cited

U.S. PATENT DOCUMENTS 9,456,358 B2    9/2016  Chen et al.
10,455,635 B2 * 10/2019  Park ..................... H04W 76/20
(Continued)

FOREIGN PATENT DOCUMENTS

CN    102938688 A    2/2013
CN    103036655 A    4/2013
(Continued)

OTHER PUBLICATIONS

International Search Report and Written Opinion—PCT/CN2016/080889—ISA/EPO—dated Jan. 20, 2017.
(Continued)

Primary Examiner — Eunsook Choi
(74) Attorney, Agent, or Firm — Liem T. Do

(57) ABSTRACT

Dynamic channel state information (CSI) reference signal (CSI-RS) activation/deactivation via layer 1 signaling is discussed. An eNB may configure multiple dynamic CSI-RS resource configurations for a given user equipment (UE). Multiple dynamic CSI-RS configurations may be associated with CSI processes, and also one or more dynamic CSI-RS resources may be associated with multiple CSI processes. Each dynamic CSI-RS resource configuration may include the number of ports, RE locations, and power ratio, as well as the subframe configuration, which may include periodicity and subframe offset. The eNB may dynamically trigger or release the different dynamic CSI-RS resources through layer 1 signaling. Additional aspects provide for ways to determine dynamic CSI-RS transmission instances, to enhance rate matching to support dynamic CSI-RS transmissions, and to report CSI for dynamic CSI-RS resources.

28 Claims, 11 Drawing Sheets

(51) Int. Cl.
*H04L 1/16* (2006.01)
*H04B 7/0456* (2017.01)
*H04W 72/04* (2009.01)

(52) U.S. Cl.
CPC .............. *H04L 1/16* (2013.01); *H04L 5/0048* (2013.01); *H04L 5/0057* (2013.01); *H04W 72/042* (2013.01); *H04L 5/0007* (2013.01)

(56) References Cited

U.S. PATENT DOCUMENTS

| | | | |
|---|---|---|---|
| 2009/0305698 A1* | 12/2009 | Zhang | H04L 1/0028 455/434 |
| 2011/0294491 A1* | 12/2011 | Fong | H04L 5/001 455/422.1 |
| 2013/0028182 A1* | 1/2013 | Geirhofer | H04L 5/0051 370/328 |
| 2015/0288505 A1 | 10/2015 | Park et al. | |
| 2016/0105817 A1 | 4/2016 | Frenne et al. | |
| 2016/0277954 A1* | 9/2016 | Frenne | H04B 7/0647 |

FOREIGN PATENT DOCUMENTS

| | | |
|---|---|---|
| CN | 103391174 A | 11/2013 |
| CN | 103580742 A | 2/2014 |
| CN | 103959692 A | 7/2014 |
| WO | WO-2014028346 A2 | 2/2014 |
| WO | WO-2016056981 A1 | 4/2016 |

OTHER PUBLICATIONS

International Search Report and Written Opinion—PCT/CN2017/082223—ISA/EPO—dated Jul. 20, 2017.
Supplementary European Search Report—EP17792452—Search Authority—The Hague—dated Nov. 8, 2019.

* cited by examiner

DYNAMIC CSI-RS TRANSMISSION FOR ENHANCED FD-MIMO

CROSS-REFERENCE TO RELATED APPLICATIONS

This application claims the benefit of PCT/CN2016/080889, entitled, "DYNAMIC CSI-RS TRANSMISSION FOR ENHANCED FD-MIMO," filed on May 3, 2016, which is expressly incorporated by reference herein in its entirety.

BACKGROUND

Field

Aspects of the present disclosure relate generally to wireless communication systems, and more particularly, to dynamic channel state information (CSI) reference signal (CSI-RS) transmission for enhanced full dimension multiple input, multiple output (eFD-MIMO) systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes configuring a plurality of dynamic channel state information (CSI) reference signal (CSI-RS) resource configurations for each of one or more user equipments (UEs) within a coverage area, determining a communication activity level related to the one or more UEs, selecting one or more CSI-RS resource configurations of the plurality of dynamic CSI-RS resource configurations based on the determined communication activity level, signaling a CSI-RS trigger to each of the one or more UEs via layer 1 signaling, wherein the CSI-RS trigger identifies the selected one or more CSI-RS resource configurations, and transmitting CSI-RS according to the selected one or more CSI-RS resource configurations.

In one aspect of the disclosure, a method of wireless communication includes receiving configuration for a plurality of dynamic CSI-RS resource configurations, receiving configuration for CSI reporting for one or more CSI processes, decoding a layer 1 signal identifying activated dynamic CSI-RS resources, transmitting an acknowledgement in response to decoding the layer 1 signal, detecting CSI-RS signals according to the identified activated dynamic CSI-RS resources, and transmitting a CSI report based on detected CSI-RS signals.

In an additional aspect of the disclosure, an apparatus configured for wireless communication includes means for configuring a plurality of dynamic CSI-RS resource configurations for each of one or more UEs within a coverage area, means for determining a communication activity level related to the one or more UEs, means for selecting one or more CSI-RS resource configurations of the plurality of dynamic CSI-RS resource configurations based on the determined communication activity level, means for signaling a CSI-RS trigger to each of the one or more UEs via layer 1 signaling, wherein the CSI-RS trigger identifies the selected one or more CSI-RS resource configurations, and means for transmitting CSI-RS according to the selected one or more CSI-RS resource configurations.

In an additional aspect of the disclosure, an apparatus configured for wireless communication includes means for receiving configuration for a plurality of dynamic CSI-RS resource configurations, means for receiving configuration for CSI reporting for one or more CSI processes, means for decoding a layer 1 signal identifying activated dynamic CSI-RS resources, means for transmitting an acknowledgement in response to decoding the layer 1 signal, means for detecting CSI-RS signals according to the identified activated dynamic CSI-RS resources, and means for transmitting a CSI report based on detected CSI-RS signals.

In an additional aspect of the disclosure, a non-transitory computer-readable medium having program code recorded thereon. The program code further includes code to configure a plurality of dynamic CSI-RS resource configurations for each of one or more UEs within a coverage area, code to determine a communication activity level related to the one or more UEs, code to select one or more CSI-RS resource configurations of the plurality of dynamic CSI-RS resource configurations based on the determined communication activity level, code to signal a CSI-RS trigger to each of the one or more UEs via layer 1 signaling, wherein the CSI-RS trigger identifies the selected one or more CSI-RS resource configurations, and code to transmit CSI-RS according to the selected one or more CSI-RS resource configurations.

In an additional aspect of the disclosure, a non-transitory computer-readable medium having program code recorded thereon. The program code further includes code to receive configuration for a plurality of dynamic CSI-RS resource configurations, code to receive configuration for CSI reporting for one or more CSI processes, code to decode a layer 1 signal identifying activated dynamic CSI-RS resources, code to transmit an acknowledgement in response to decoding the layer 1 signal, code to detect CSI-RS signals according to the identified activated dynamic CSI-RS resources, and code to transmit a CSI report based on detected CSI-RS signals.

In an additional aspect of the disclosure, an apparatus configured for wireless communication is disclosed. The apparatus includes at least one processor, and a memory coupled to the processor. The processor is configured to configure a plurality of dynamic CSI-RS resource configurations for each of one or more UEs within a coverage area, to determine a communication activity level related to the one or more UEs, to select one or more CSI-RS resource configurations of the plurality of dynamic CSI-RS resource configurations based on the determined communication activity level, to signal a CSI-RS trigger to each of the one or more UEs via layer 1 signaling, wherein the CSI-RS trigger identifies the selected one or more CSI-RS resource configurations, and to transmit CSI-RS according to the selected one or more CSI-RS resource configurations.

In an additional aspect of the disclosure, an apparatus configured for wireless communication is disclosed. The apparatus includes at least one processor, and a memory coupled to the processor. The processor is configured to receive configuration for a plurality of dynamic CSI-RS resource configurations, to receive configuration for CSI reporting for one or more CSI processes, to decode a layer 1 signal identifying activated dynamic CSI-RS resources, to transmit an acknowledgement in response to decoding the layer 1 signal, to detect CSI-RS signals according to the identified activated dynamic CSI-RS resources, and to transmit a CSI report based on detected CSI-RS signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
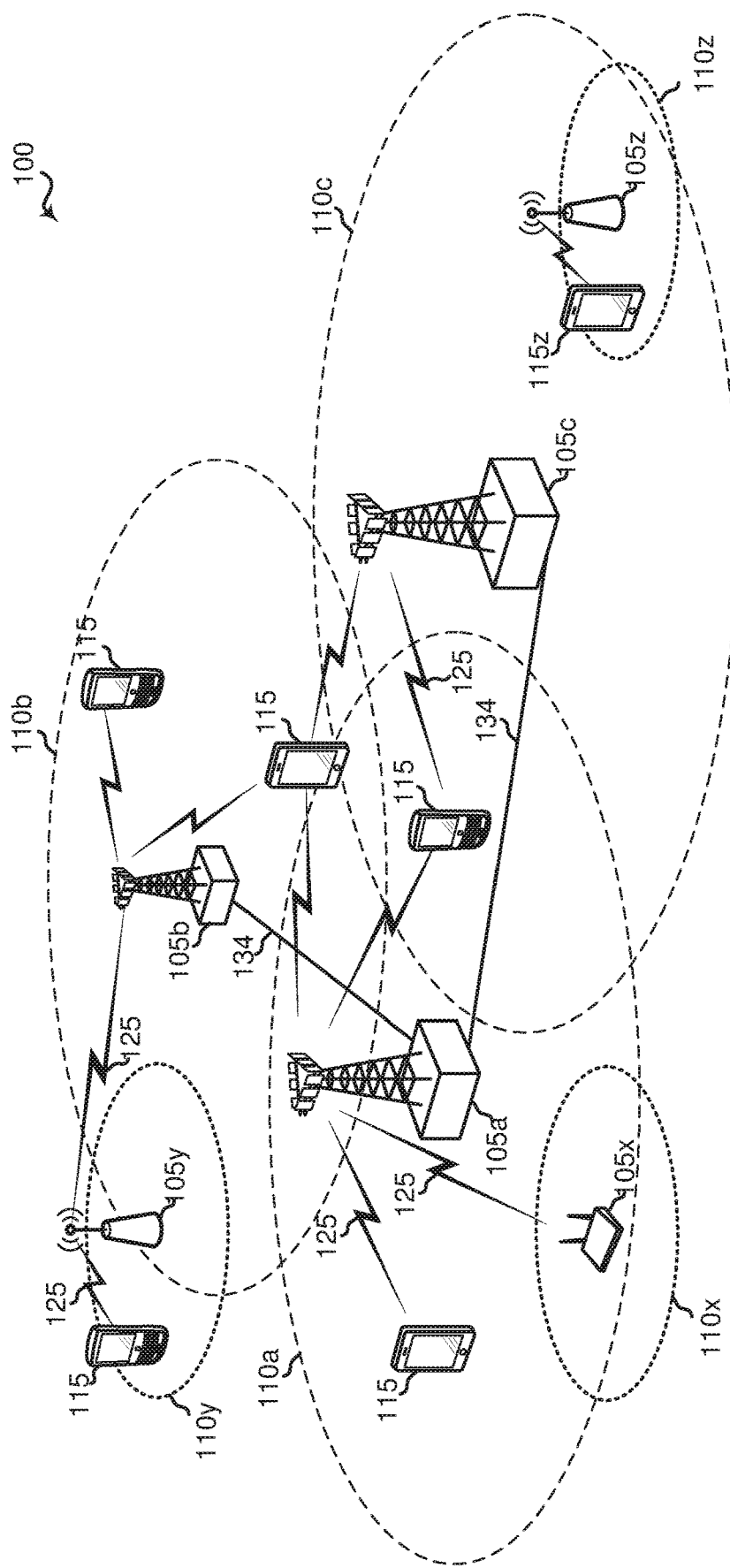
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
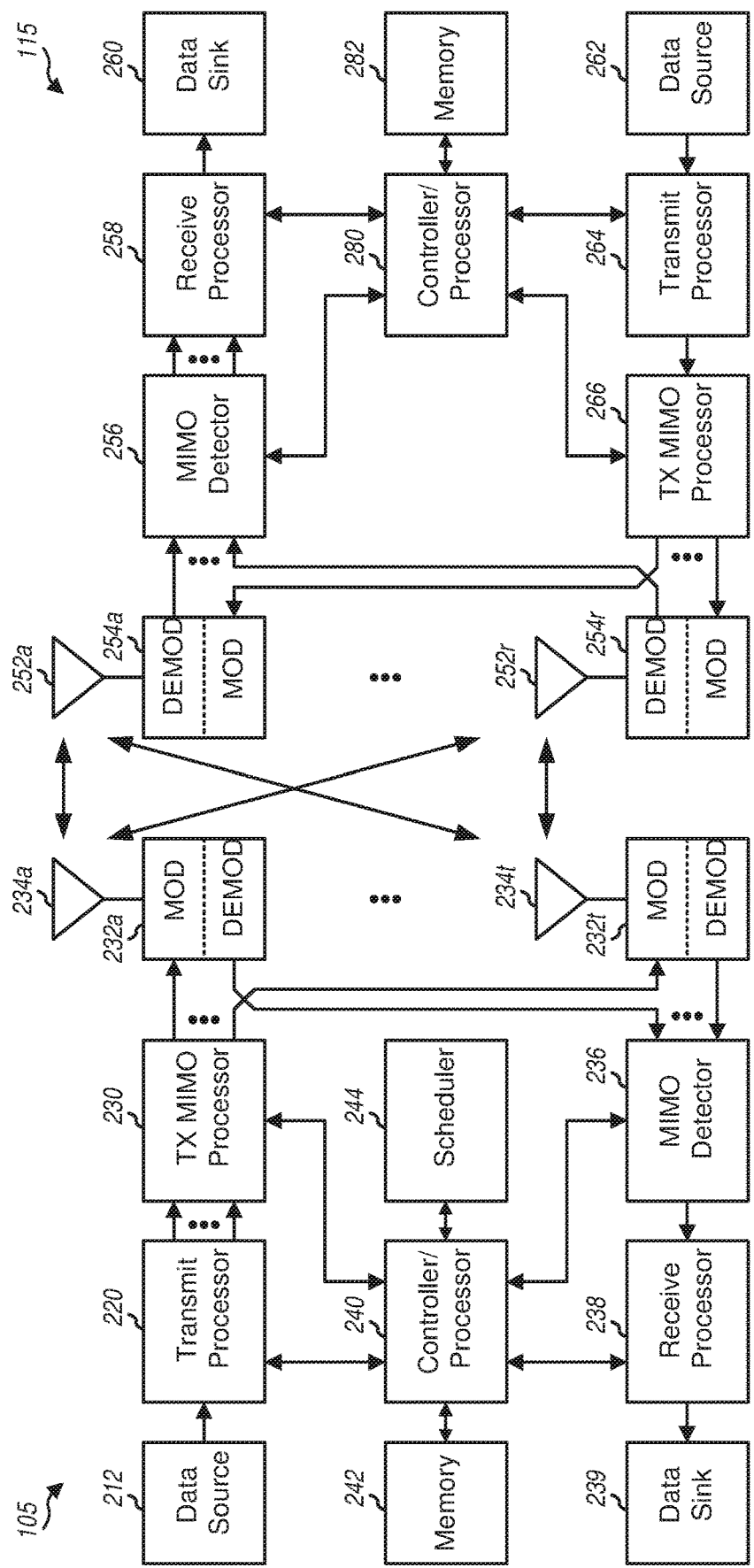
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to a controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 5 and 10, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
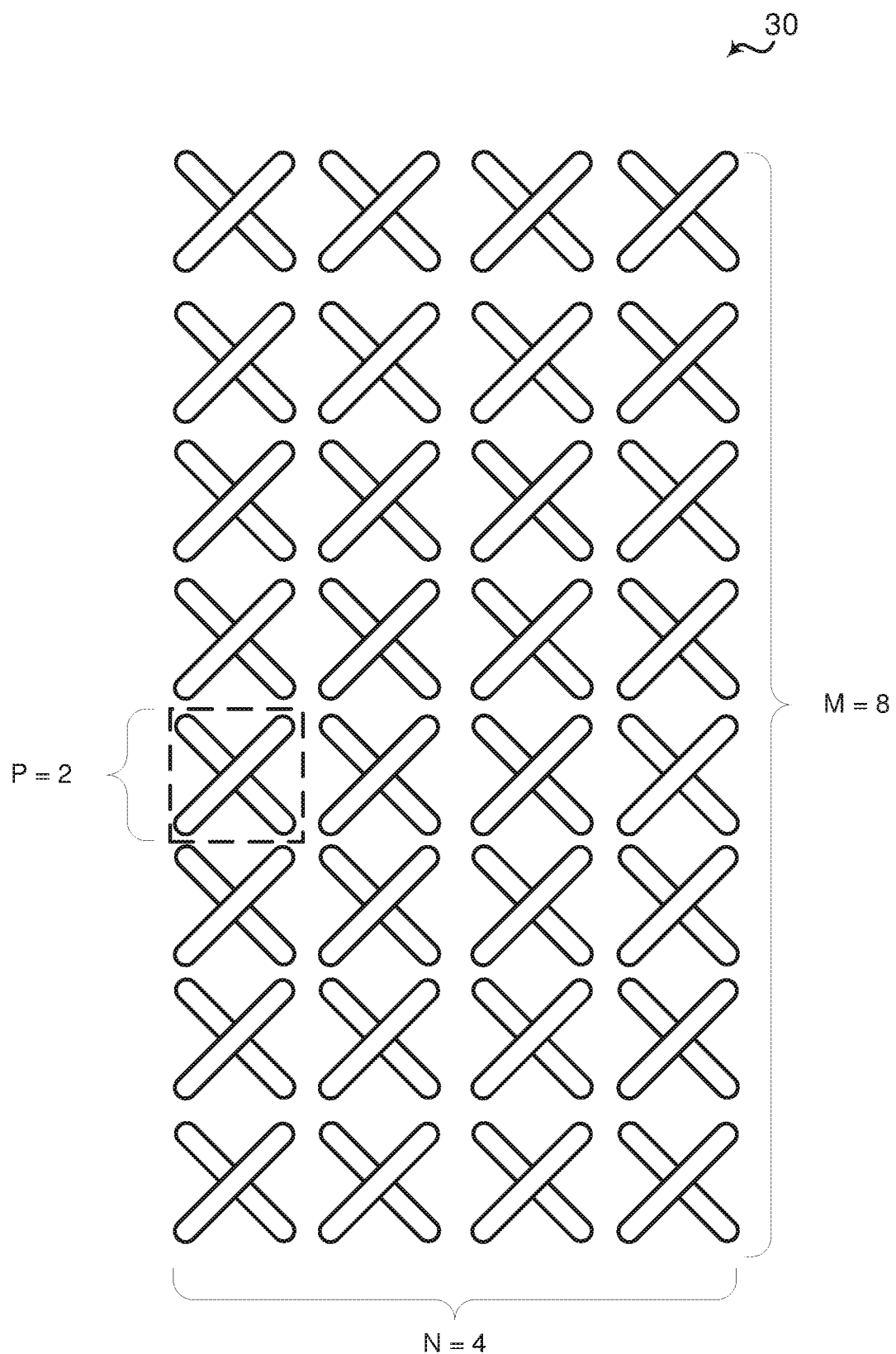
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook (s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
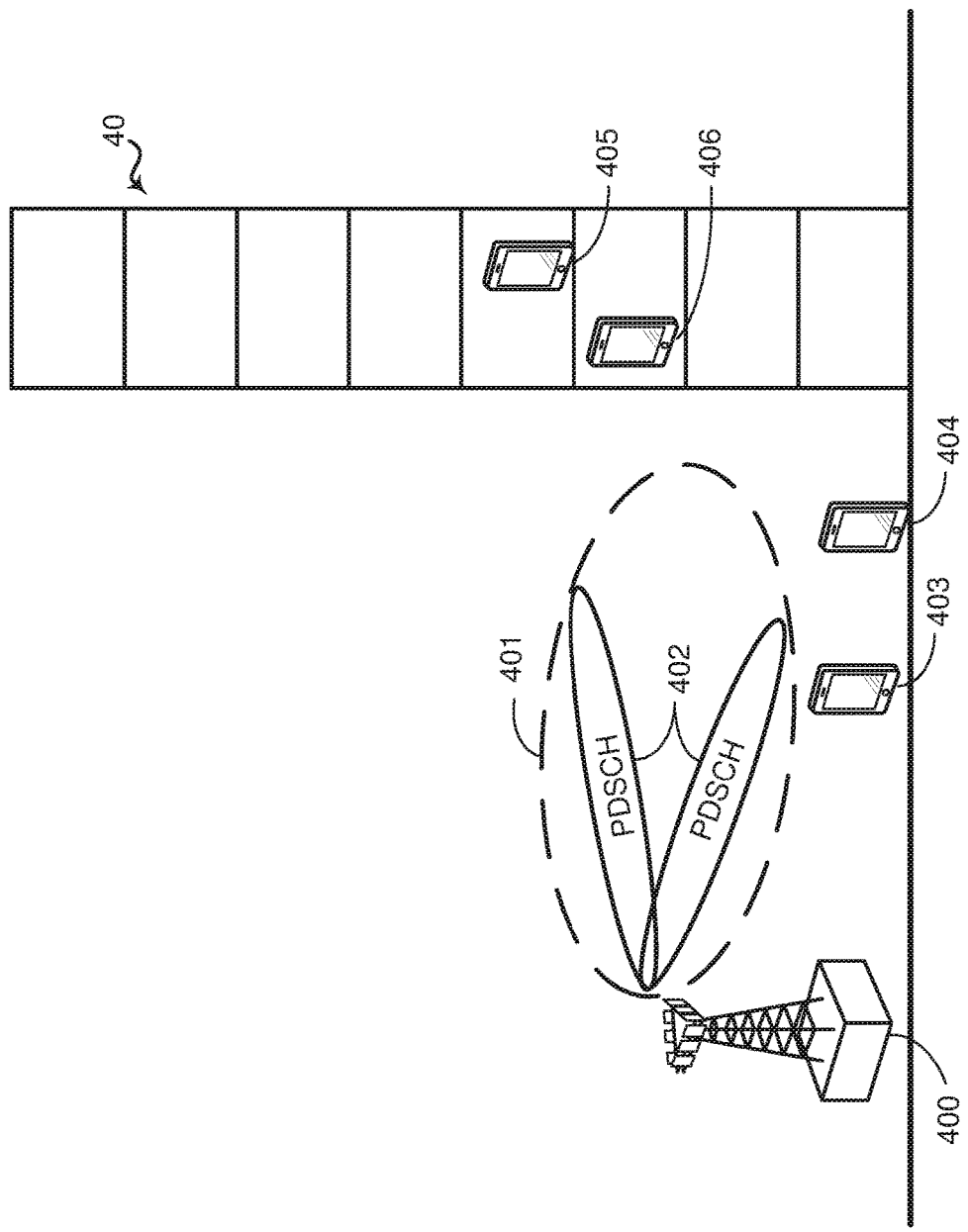
FIG. 4A is a block diagram illustrating an example base station transmitting non-precoded CSI-RS.

For CSI reporting in systems having FD-MIMO, a CSI process stay be configured with either of two CSI reporting classes, class A non-precoded or class B beamformed. FIG. 4A is a block diagram illustrating an example base station 400 transmitting non-precoded CSI-RS 401. In class A non-precoded reporting, one non-zero power (NZP) CSI-RS resource per CSI process may be used for channel measurement in which the number of CSI-RS ports may be 8, 12, or 16. Interference measurement in class A reporting may include one CSI-interference measurement (IM) resource per CSI process.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, preceding matrix indicator (PMI) (2D codebook), and rank indicator to base station 400.

Figure 4B:
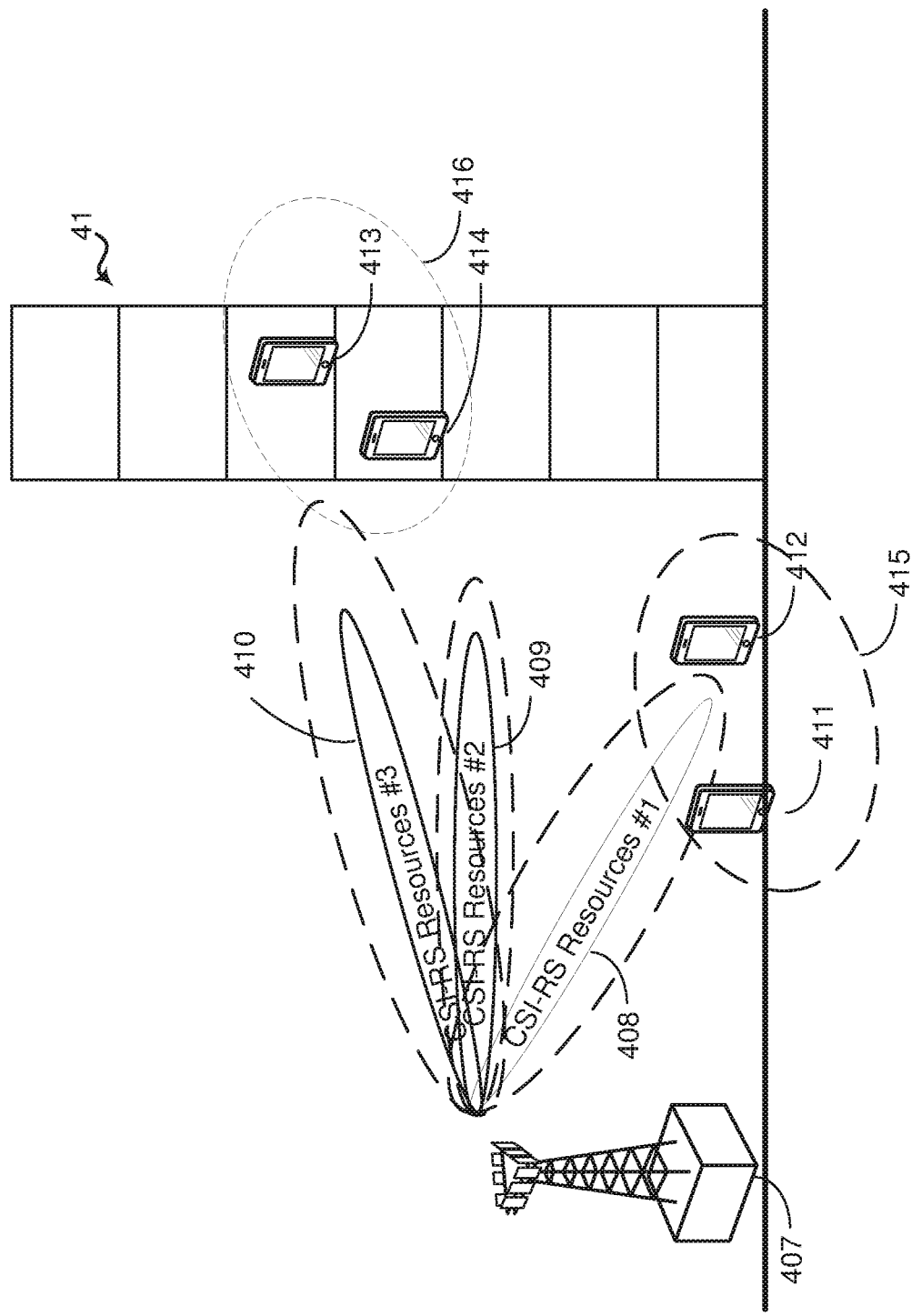
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource.

Enhancing FD-MIMO may be accomplished through control of CSI-RS overhead. Legacy CSI-RS is semi-statically configured and transmitted. RRC configuration messages that configure such legacy CSI-RS include the number of antenna ports, CSI-RS resource configuration (e.g., RE locations), subframe periodicity, offset, power ratio, and the like. The resources occupied by CSI-RS may not be used for other purposes, such as data transmission. A UE would apply rate matching to any PDSCH around the configured zero power (ZP) and NZP CSI-RS resources. The ZP CSI-RS resource for PDSCH rate matching can be indicated by DCI format, for example.

For UE specific beamformed CSI-RS, the total CSI-RS overhead per cell increases with the number of served UEs, which can be in the hundreds. For non-precoded CSI-RS, there may also be significant increase of CSI-RS overhead when the number of ports is increased to 64. For 5 ms CSI-RS, the downlink overhead is generally increased by 6.67% when the number of CSI-RS ports is increased from 8 to 64. Thus, CSI-RS overhead reduction would be beneficial for enhanced FD-MIMO (eFD-MIMO).

Another improvement for providing eFD-MIMO includes increasing the flexibility of CSI-RS configuration. Legacy CSI-RS is transmitted on a pre-configured time grid of 5 ms resulting in a very low CSI-RS resource utilization efficiency. For example, even with a UE that has no downlink traffic in the queue, CSI-RS transmissions are still reserved in the pre-configured time grid. Thus, when the communication activity level for any of the UEs being served is low, either because there is no downlink traffic in the queue or the UE is deactivated or travels out of the coverage area, CSI-RS transmissions are currently still reserved. It would be more efficient to have a dynamic transmission periodicity that is based on the need for CSI accuracy. Moreover, reduction of eNB transmission power for CSI-RS should be considered when the number of CSI-RS ports is increased. In one such example, when the communication activity level is low, such as when there are no active UEs with downlink traffic in the cell, CSI-RS may be transmitted over fewer ports. An additional improvement for eFD-MIMO may improve trunking efficiency by pooling CSI-RS resources for UE specific beamformed CSI-RS so that an eNB can freely choose and transmit one configuration out of multiple CSI-RS configurations for CSI reporting. For example, the resource pool may be shared by a group of UEs.

In one existing solution for more dynamic configuration, aperiodic CSI-RS transmissions are triggered by dynamic indication without pre-configured instances, which provides more flexible resource usage. Such solution is configured for PUSCH based A-CSI reporting. Resource allocation/configuration may be semi-static, including number of ports, CSI-RS pattern, and the like, for example, with RE locations and power ratio. Presence/absence may be dynamically signaled through reuse of the CSI triggering field in an uplink grant, such as the uplink grant assigning aperiodic CSI-RS resources in the same subframe for a one-shot transmission. Potential issues with an aperiodic CSI-RS resource solution include the reduction of CSI processing time, as a UE would first decode the PDCCH or EPDCCH in order to know the presence of the aperiodic CSI-RS transmission in the subframe. Additionally, the CSI-RS could be later than the CSI-RS reference resource, if the reference resource is prior to the A-CSI triggering subframe for multiple configured CSI processes. Finally, such an aperiodic CSI-RS resource solution is unknown to legacy UE, and, thus, not backward compatible.

Another potential solution to provide increased resource utilization efficiency may include more flexible activation/deactivation of CSI-RS. For example, one or multiple CSI-RS resources may be activated/deactivated using layer 2 signaling, such as through MAC control element (CE), instead of RRC signaling, for CSI reporting. The activated CSI-RS will be periodically transmitted from the first available downlink subframe according to a pre-configured subframe configuration until it is deactivated. Trunk efficiency may be achieved here through the flexibility to trigger one of multiple CSI-RS configurations according to the communication activity level, such as on UE presence and need for resource sharing. However, such CSI-RS activation/deactivation based on layer 2 signaling may become inefficient because of the inefficiency of layer 2 signaling for indicated activation/deactivation. This type of layer 2 signaling may not be efficient because of the relatively long layer 2 latency. For example, the earliest CSI-RS transmission on subframe with a layer 2 trigger at subframe n would be at subframe n+4. The time domain flexibility may still be limited also because the CSI-RS transmission instance is still based on the preconfigured subframe configuration. Moreover, there is no support of cross-carrier CSI-RS activation/deactivation.

Various aspects of the present disclosure provide for dynamic indications of activated/deactivated CSI-RS via layer 1 signaling, such as through the PDCCH or EPDCCH. The eNB may configure multiple dynamic CSI-RS resource configurations for a given UE. Multiple dynamic CSI-RS configurations can be associated with various CSI processes, and one or more dynamic CSI-RS resources may be associated with multiple CSI processes. Each dynamic CSI-RS resource configuration may include the number of ports, RE locations, and power ratio, as well as the subframe configuration information, including, for example periodicity, subframe offset, and the like. The eNB can dynamically trigger or release the different dynamic CSI-RS resources through the layer 1 signaling based on communication activity level, with a single DCI activating CSI-RS presence for one or more subframes. Moreover, cross-carrier trigger/release of dynamic CSI-RS may also be supported.

Figure 5:
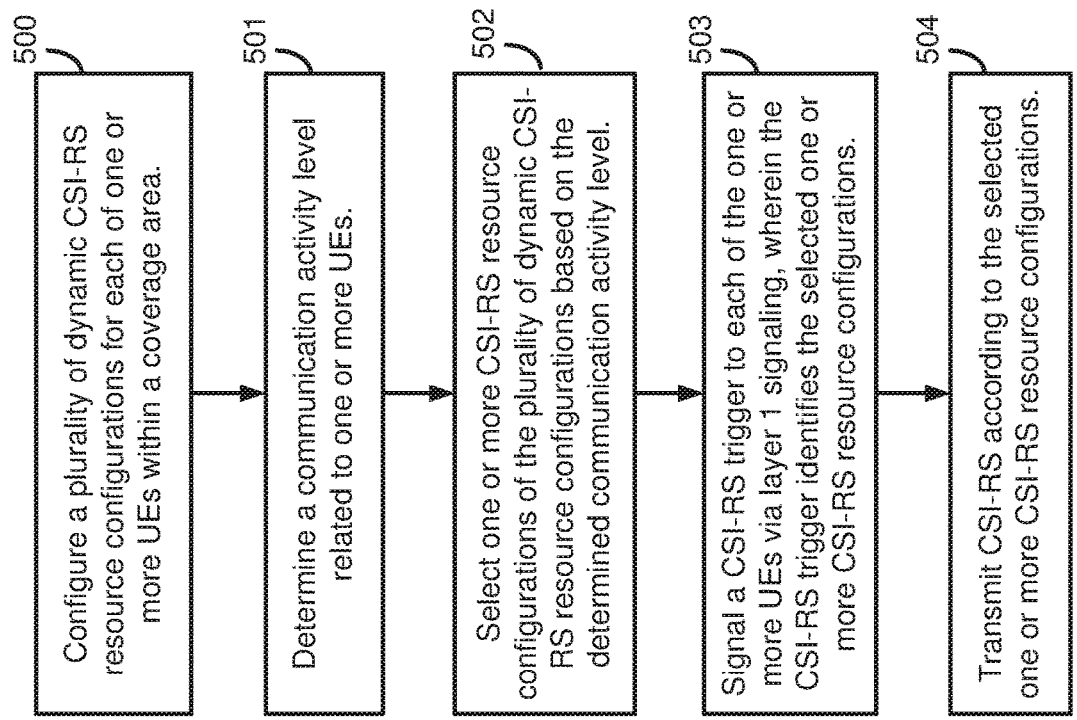
FIG. 5 is a block diagram illustrating example blocks executed to implement aspect of the present disclosure.
Figure 9:
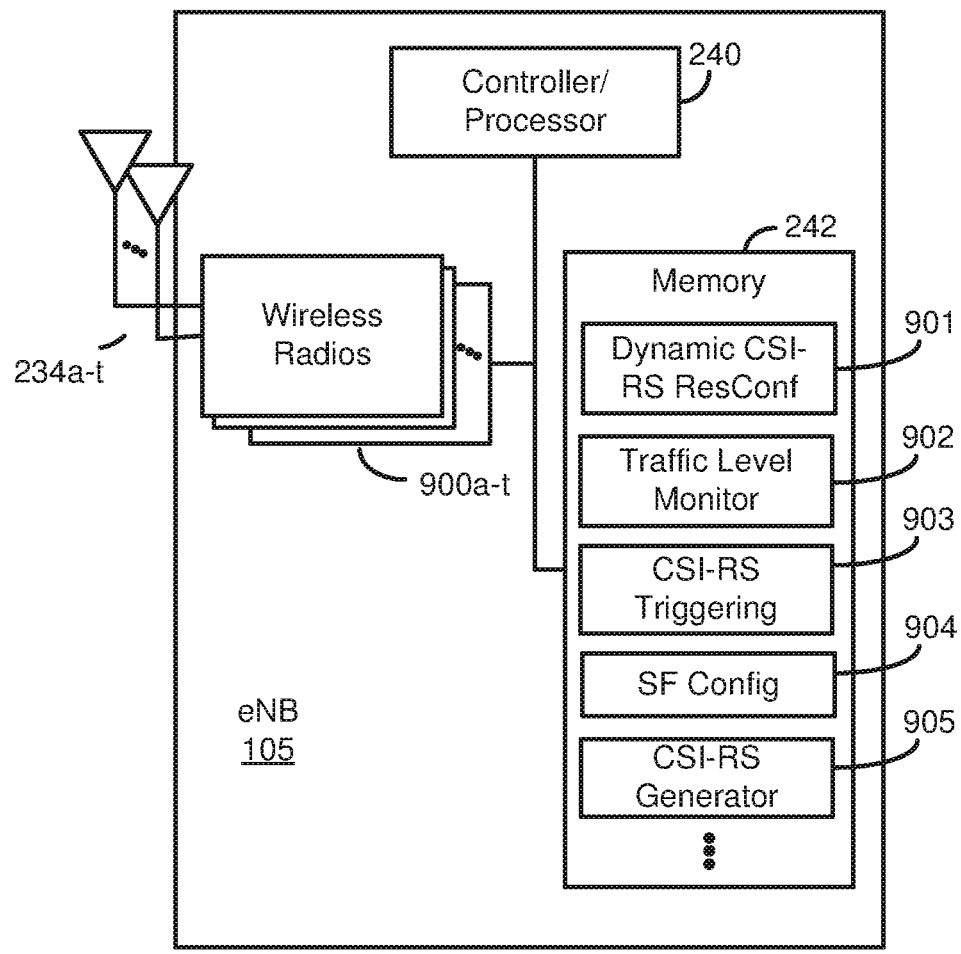
FIG. 9 is a block diagram illustrating an eNB configured according to one aspect of the present disclosure.

FIG. 5 is a block diagram illustrating example blocks executed to implement one aspect of the present disclosure. The example blocks will also be described with respect to eNB 105 as illustrated in FIG. 9. FIG. 9 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 900a-t and antennas 234a-t. Wireless radios 900a-t includes various components and hardware, as illustrated in FIG. 2 for eNB 105, including modulator/demodulators 232a-t, MIMO detector 236, receive processor 238, transmit processor 220, and TX MIMO processor 230.

At block 500, a base station configures a plurality of dynamic CSI-RS resource configurations for each of one or more UEs within a coverage area. For example, eNB 105, under control of controller/processor 240, executes dynamic CSI-RS resource configuration logic 901, stored in memory 242. The execution environment created by dynamic CSI-RS resource configuration logic 901, configures multiple dynamic CSI-RS resource configurations for the UEs within eNB 105's coverage area. The CSI-RS resource configurations may include the number of ports, RE locations, and power ratio, in addition to the periodicity and subframe offset included in subframe configuration 904, stored in memory 242, associated with the CSI-RS resource configurations.

At block 501, the base station determines a communication activity level related to the one or more UEs. For example, eNB 105, under control of controller/processor 240 executes traffic level monitor 902, stored in memory 242 to determine the communication activity levels for the served UEs. By monitoring the current traffic and any data stored in downlink queues for the served UEs, in addition to monitoring when a UE may no longer be served by eNB 105, the execution environment of traffic level monitor 902 allows eNB 105 to determine the communication activity level, such as when the served UEs have higher or lower traffic needs.

At block 502, the base station selects one or more CSI-RS resource configurations of the plurality of dynamic CSI-RS resource configurations based on the determined communication activity level. Depending on the traffic needs of the served UEs, eNB 105, under control of controller/processor 240, will select which of the configured dynamic CSI-RS resource configurations should be activated.

At block 503, the base station signals a CSI-RS trigger to each of the one or more UEs via layer 1 signaling, wherein the CSI-RS trigger identifies the selected one or more CSI-RS resource configurations. For example, eNB 105, under control of controller/processor 240 executes CSI-RS triggering 903 to generate a CSI-RS trigger that will identify to the served US which of the configured CSI-RS resource configurations are activated and which are released or deactivated. In one example aspect, the CSI-RS trigger may be a bitmap which indicates the activated and released resource configurations. In other example aspects, triggering states may be identified which are predefined and known to the UE to associate with specific ones of the configured CSI-RS resource configurations that are activated. eNB 105 transmits the CSI-RS trigger via wireless radios 900a-t and antennas 234a-t.

At block 504, the base station transmits CSI-RS according to the selected one or more CSI-RS resource configurations. For example, eNB 105, under control of controller/processor 240, executes CSI-RS generator 905 to generate the CSI-RS for transmission via wireless radios 900a-t and antennas 234a-t according to the activated CSI-RS resource configurations.

Figure 6:
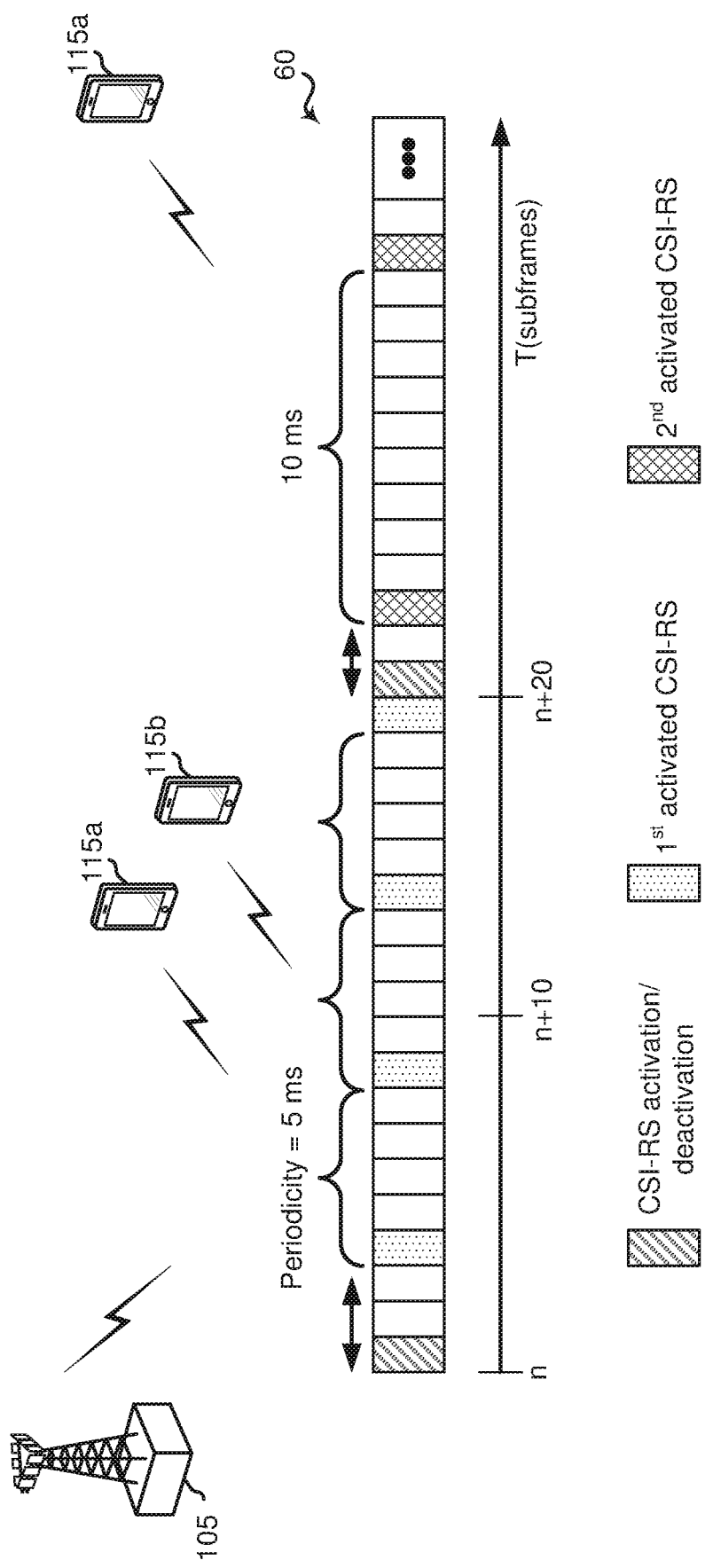
FIG. 6 is a block diagram illustrating a communication stream between an eNB and a UE configured according to one aspect of the present disclosure.

FIG. 6 is a block diagram illustrating a communication stream 60 between eNB 105 and UE 115 configured according to one aspect of the present disclosure. In the described aspects, the dynamic CSI-RS may be activated by eNB 105 at subframe n, while the remaining CSI-RS are received periodically by UEs 115a and 115b according to the CSI-RS activation command received earlier. eNB 105 dynamically allocates new CSI-RS resources at subframe n for CSI reporting based on need for CSI accuracy and/or accommodating new UEs, such as when UE 115b comes into the same area as UE 115a. The dynamic CSI-RS is reactivated by eNB 105 at subframe n+19 when UE 115b leaves the coverage area. The remaining CSI-RS are received by UE 115a following the CSI-RS activation configured at subframe n+19.

The subframe configuration may be configured and signaled through higher layer signaling from eNB 105 to UEs 115a and 115b to define the dynamic CSI-RS transmission interval, T, and a subframe offset, Δ. In a first option for determining when to begin the CSI-RS transmission, the transmission may be started from the first available downlink subframe after the triggering subframe satisfying the relationship: $(10*n_f+floor(n_s/2)-\Delta)mod(T)$, where $n_f$ and $n_s$ are the radio frame number and slot number. In a second option for determining transmission, the CSI-RS transmission may begin from Δ subframes after the triggering subframe and then will be periodically transmitted thereafter every T subframes. For example, assuming the current transmission time interval (TTI) is the TTI at which the UE is receiving the CSI-RS trigger signal, eNB 105 will begin transmitting CSI-RS on the subframe satisfying the relationship: $TTI=current\_TTI+\Delta+m*T$, where m=0, 1, ... M−1, where M is the number of dynamic CSI-RS transmission instances. The second option has the benefit of reducing the delay between the triggering and transmission and provides more configuration flexibility.

Assuming K configured dynamic CSI-RS resources, the triggering layer 1 signal may be based on various alternatives. For example, a first option uses a K-bit bitmap corresponding to each CSI-RS resource, with a value '1' to activate the CSI-RS and '0' to release. In such an optional method more flexibility is provided through the independent trigger/release per CSI-RS resource. However, the independent trigger/release may cause additional layer 1 signaling overhead. In a second option, each triggering state may be associated with one or more preconfigured combination sets of CSI process, dynamic CSI-RS resource, and the like. While this second option allows activation/deactivation on a per CSI process basis, more complex configurations may be used for the combination set, which increases the complexity of the solution.

In the second option for triggering layer 1 signal, assumptions may be made with regard to CSI-RS activation/deactivation. For example, a total of K dynamic CSI-RS resources are configured for a given UE. K' (K'<=K) CSI-RS resources may be associated with a CSI process, and four triggering states (e.g., 00, 01, 10, and 11), may be supported by the CSI-RS activation/deactivation signal (such as PDCCH, EPDCCH). The association of trigger state and the combination set of CSI process and dynamic CSI-RS resources may be configured via higher layer signaling. For each CSI-RS resource in the CSI process (e.g., k=0 . . . , K'−1), one or more triggering states may be configured by higher layer. For example, with reference to Table 1 below, trigger01 may activate $1^{st}$ and $2^{nd}$ CSI-RS resources in the associated CSI process, while trigger 11 activates the last CSI-RS resources in the CSI process. A trigger state may activate CSI-RS resources for multiple CSI processes according to higher layer configuration.

TABLE 1

|  | 0 | 1 | 2 | ... | K' |
|---|---|---|---|---|---|
| trigger00 | — | — | — |  | — |
| trigger01 | X | X | — |  | — |
| trigger10 | — | — | X |  | X |
| trigger 11 | — | — | — |  | X |

Figure 7:
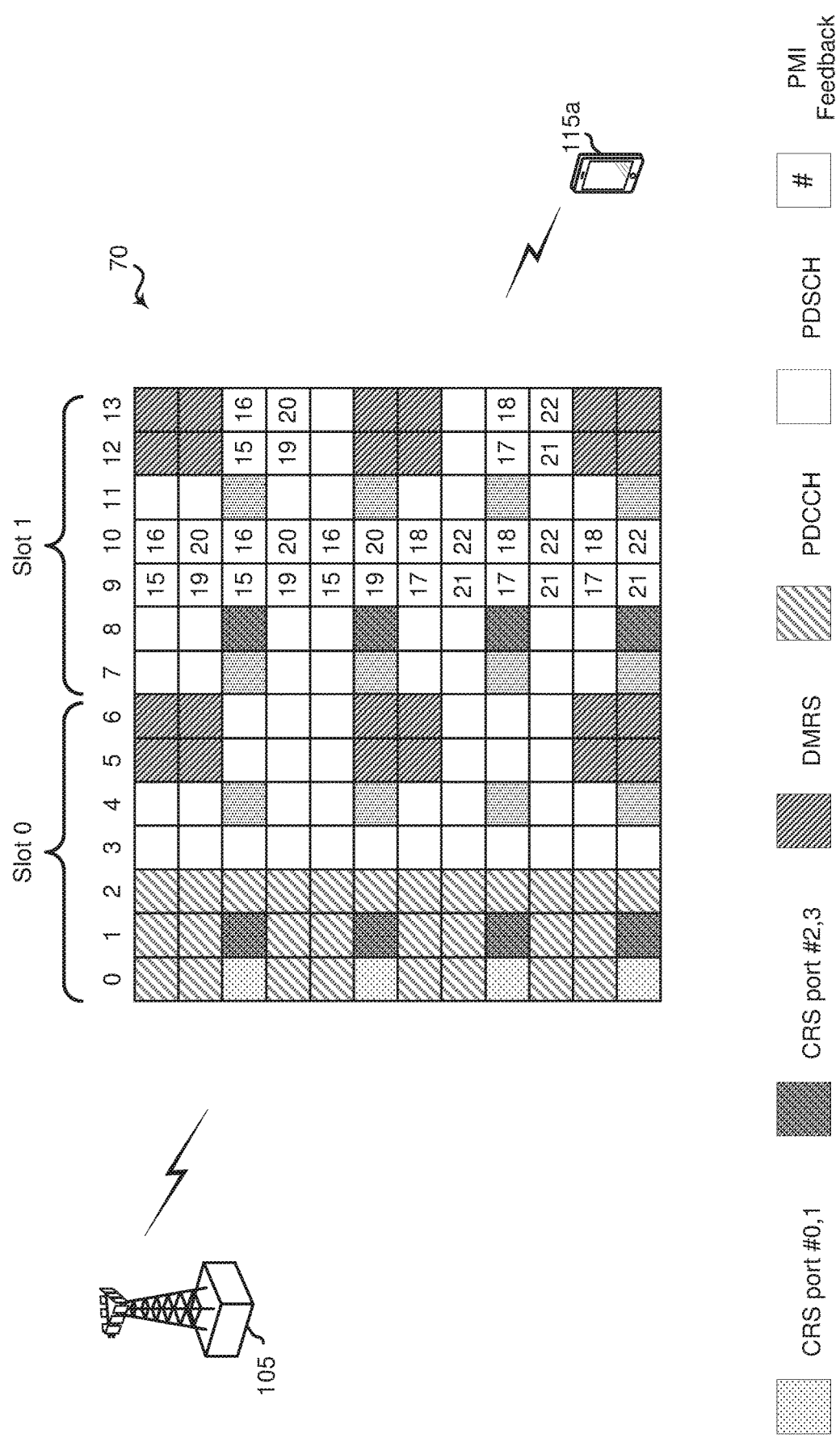
FIG. 7 is a block diagram illustrating a subframe with transmissions from an eNB to a configured according to one aspect of the present disclosure.

FIG. 7 is a block diagram illustrating a subframe 70 with transmissions from eNB 105 to UE 115a configured according to one aspect of the present disclosure. The triggering according to the various aspects may also include CSI-RS transmission on the same subframe, such as subframe 70. It is preferred that the activated CSI-RS is transmitted at least one subframe later than the triggering subframe by consideration of CSI processing time at UE. However, if the trigger is via PDCCH, such as in slot 0 of subframe 70, it is possible to support dynamic CSI-RS beginning in the same subframe, subframe 70, as the triggering PDCCH. In such example aspects, in which the PDCCH from eNB 105 in slot 0 of subframe 70 includes the triggering signal, the NZP CSI-RS configurations in slot 1 may be configured as dynamic CSI-RS resources.

In additional aspects of the present disclosure cross-component carrier (CC) trigger/release of the dynamic CSI-RS resources may also be provided. In a first example implementation of cross-CC triggering, the Carrier Indicator Field (CIF) in the uplink or downlink grant may be reused. For example, the activation/deactivation signal in one TTI may be dedicated for a given CC, while the signal in another TTI is dedicated for a different CC. Alternatively, in a second option for cross-CC triggering, each triggering state can be associated with one or more CCs, as configured through higher layer configuration. For example, referring back to Table 1, trigger10 may activate CSI-RS presence for a CSI process on a first CC, while trigger11 activates CSI-RS presence for a CSI process on a second CC. In either such options, the activated CSI-RS resource is used for CSI reporting when the associated CC is activated, as in legacy systems.

When implementing the layer 1 signaling for CSI-RS triggering/release using PDCCH or EPDCCH, two design choices may be used. In a first optional design, a new field for CSI-RS activation/deactivation is added to the existing uplink or downlink grant. Therefore, CSI-RS trigger is transmitted together with the uplink or downlink grant. In a second optional design, a PDCCH or EPDCCH dedicated for CSI-RS activation/deactivation may be defined. For the second design, the existing DCI formats can be reused, and the CSI-RS activation/deactivation can reuse the existing some fields. For example, some fields, such as the resource block assignment field, in the DCI format may be reused to indicate the activated/deactivated CSI-RS resources. The second design may be preferred in certain circumstances, because it allows CSI-RS to be triggered/released without an uplink or downlink grant. The dedicated PDCCH or EPDCCH for CSI-RS activation/deactivation may be scrambled by using a new, dedicated radio network temporary identifier (RNTI) configured specifically for CSI-RS activation/deactivation. For the second design option, the UE will validate the received PDCCH or EPDCCH activation/release, whether or not the DCI fields are set according to a preconfigured rule.

When signalling CSI-RS activation/release using the resource block assignment field, Table 2, as follows, illustrates example field settings for validation of CSI-RS activation/deactivation PDCCH/EPDCCH. When the resource block assignment field is set to all "0's, all of the configured dynamic CSI-RS resources may be assumed to be released.

TABLE 2

|  | DCI Format 0 | DCI format 1/1A | DCI Format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | set to '10000' | N/A | N/A |
| HARQ process number | N/A | FDD: set to '000' TDD: set to '0000' | FDD: set to '000' TDD: set to '0000' |

TABLE 2-continued

|  | DCI Format 0 | DCI format 1/1A | DCI Format 2/2A/2B/2C/2D |
|---|---|---|---|
| Modulation and coding scheme | N/A | set to '10000' | For the enabled transport block: MSB is set to '10000' |
| Redundancy version | N/A | set to '00' | For the enabled transport block: set to '00' |
| NDI | set to '0' | set to '0' | For the enabled transport block: set to '0' |

Another example for the second design is to use the resource block assignment field for validation. For example, the resource block assignment field in the uplink or downlink grant is set to all '0s' or all '1s', e.g., invalid RB assignment for uplink or downlink transmission to indicate a CSI-RS activation/deactivation PDCCH/EPDCCH, and the other fields in the DCI format can be reused for CSI-RS activation/deactivation. For this example, the PDCCH or EPDCCH can be scrambled by the C-RNTI same as uplink/downlink grant PDCCH. Therefore, a PDCCH or EPDCCH either indicates a uplink/downlink grant or a CSI-RS activation/deactivation, but not both.

In Rel-13, up to four ZP CSI-RS configurations may be configured. Each ZP CSI-RS configuration includes a number of ZP CSI-RS resources sharing a common subframe configuration. For example, in a ZP subframe configuration, the resources may have a jointly coded periodicity (e.g., ≥5 m) and subframe offset, while a ZP resource configuration list may include a bitmap that indicates one or more four-RE patterns for transmission. A total of four states may be RRC-configured for dynamic indication of a rate matching assumption for PDSCH for transmission mode 10 (TM10), according to current specifications. Each rate matching state may then include one ZP CSI-RS configuration. The 2-bit field in DCI format 2D indicates one of the four rate matching states. For an EPDCCH rate matching assumption, one ZP CSI-RS configuration associated with a RRC-configured rate matching state may be used.

If the deactivated CSI-RS resources is reused for data transmission, it may be supported by the preconfigured rate matching pattern. However, for a larger number of dynamic CSI-RS resources, the number rate matching states may be much larger than four. For example, for K=4 CSI-RS resources, the possible combinations for CSI-RS activation/deactivation are $C_4^0+C_4^1+C_4^2+C_4^3+C_4^4=16$. This would suggest increasing the number of bits in the DCI format to indicate the ZP CSI-RS configuration used for PDSCH rate matching assumption. However, increasing the number of bits in the DCI format may not result in an efficient process. Instead, the rate matching process may be enhanced by associating each rate matching state with a list of ZP CSI-RS configurations. Thus, each ZP CSI-RS configuration in the list could have a different subframe configuration. The ZP CSI-RS configurations in the list may also be dynamically activated/released via dynamic layer 1 signaling, in which the activated ZP CSI-RS will be used for rate matching. EPDCCH rate matching may also be enhanced by using a list of ZP CSI-RS configurations associated with a RRC-configured rate matching state.

Figure 8:
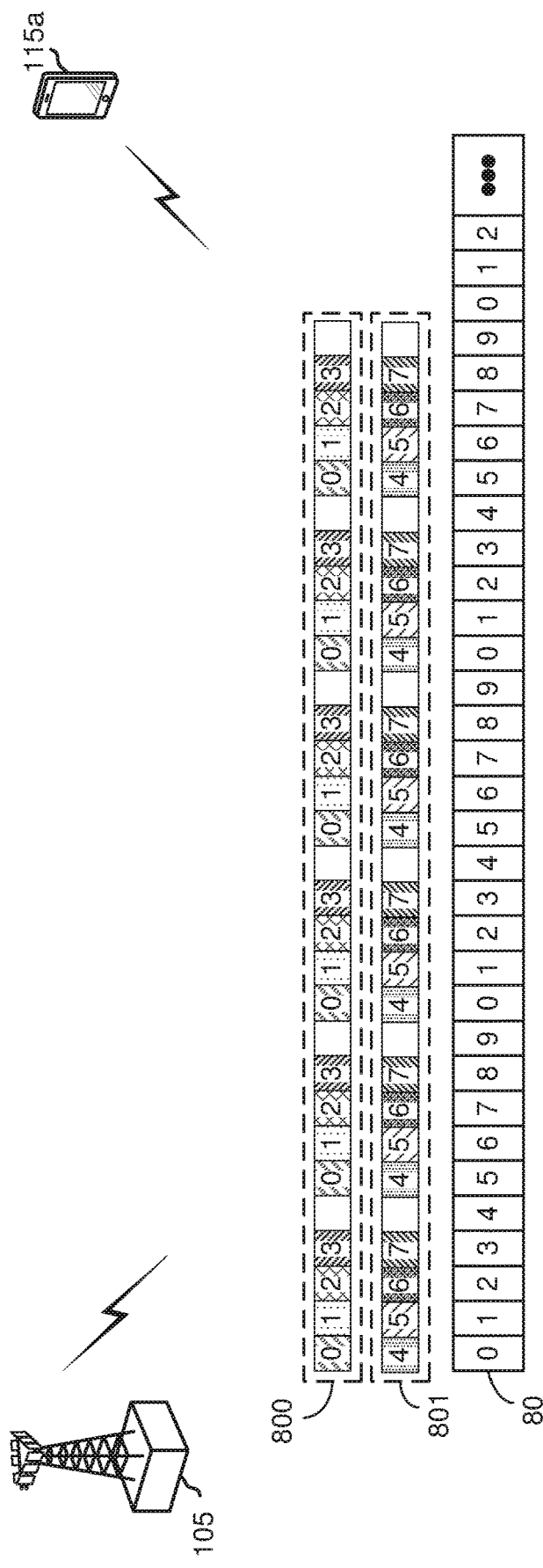
FIG. 8 is a block diagram illustrating a transmission stream between an eNB and a UE configured according to one aspect of the present disclosure.

FIG. 8 is a block diagram illustrating a transmission stream 80 between eNB 105 and UE 115*a* configured according to one aspect of the present disclosure. A first ZP CSI-RS configuration list 800 includes four ZP CSI-RS configurations, 0, 1, 2, 3, each configured with a 5 ms periodicity but different subframe offset. Second ZP CSI-RS configuration list 801 includes another four ZP CSI-RS configurations, 4, 5, 6, 7, each configured with the same periodicity but a different subframe offset. Also, configurations 0 and 4, 1 and 5, 2 and 6, 3 and 7 are configured with same subframe offset but associated with a different sets of RE patterns. A dynamic indication of ZP CSI-RS configuration lists 800 and 801 may be used to select one of two patterns for PDSCH rate matching per subframe, e.g., configuration 0 or 4 for subframe 0. In additional examples, when using four rate matching states associated with four ZP CSI-RS configuration lists, each subframe could have four different rate matching assumptions.

Another alternative for rate matching enhancements may be to use the dynamic CSI-RS resource configurations for PDSCH rate matching. For example, a UE may be indicated with more than one dynamic CSI-RS configuration by the DCI, for which some are used for CSI reporting and others used for rate matching assumption. For the deactivated dynamic NZP CSI-RS resources, there would be no rate matching, thus, the resources can be reused for PDSCH.

Currently, periodic CSI reporting is performed by UE when a periodic CSI-RS resources is configured by RRC. For a dynamic CSI-RS configuration, periodic CSI reporting may start when the CSI-RS resource is activated and may stop when the resource is deactivated. Similarly, a UE may ignore the A-CSI request for a given CSI process for which the associated CSI-RS resources are deactivated.

Figure 10:
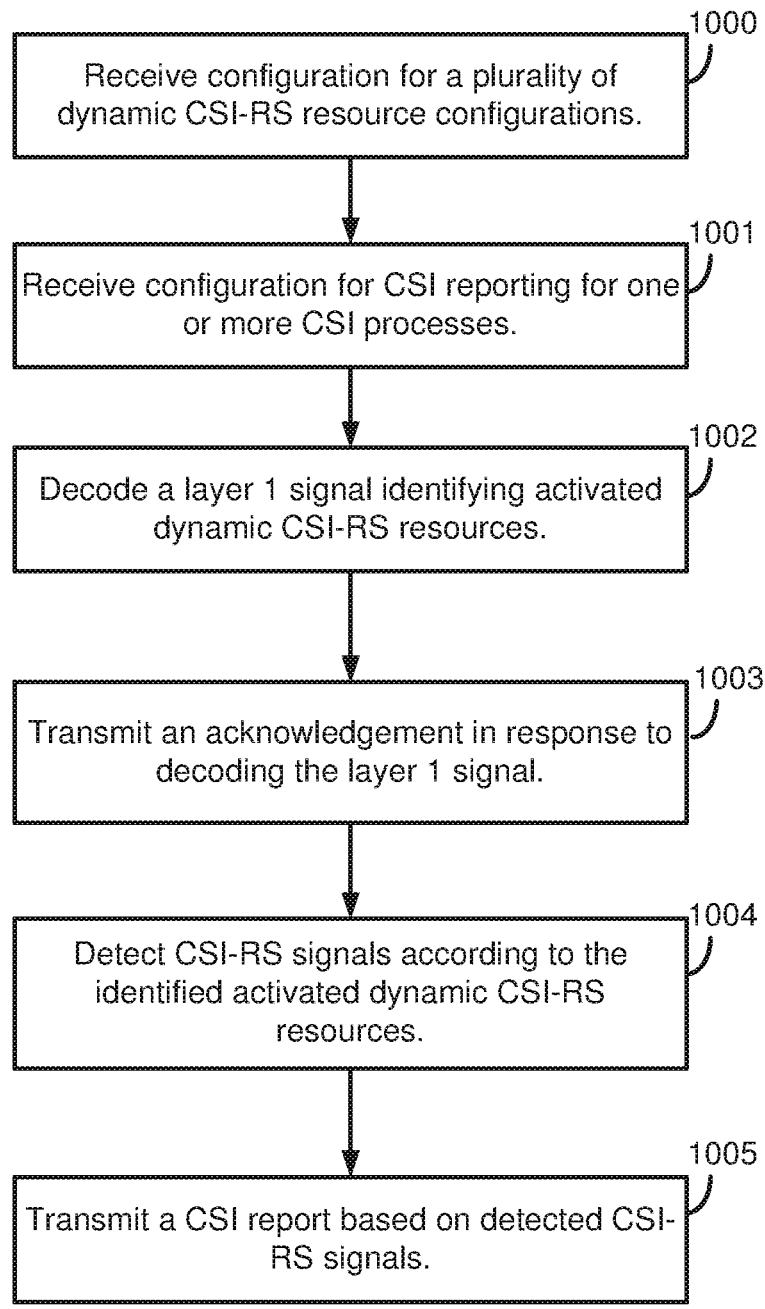
FIG. 10 is a block diagram illustrating example blocks executed to implement one aspect of the present disclosure.

FIG. 10 is a block diagram illustrating example blocks executed to implement one aspect of the present disclosure. At block 1000, a UE, such as UE 115*a*, receives configuration for a plurality of dynamic CSI-RS resource configurations. At block 1001, the UE receives configuration for CSI reporting for one or more CSI processes. At block 1002, the UE decodes a layer 1 signal identifying activated dynamic CSI-RS resources. For example, UE 115*a* may receive and decode the layer 1 signal as a PDCCH or EPDCCH. At block 1003, the UE transmits an acknowledgement in response to decoding the layer 1 signal. To avoid misalignment between the eNB and UE for CSI reporting, the UE, such as UE 115*a*, may feedback an acknowledgement (ACK/NACK) upon the reception of the PDDCH or EPDCCH for the CSI-RS activation/release. The procedure for acknowledging feedback and resource mapping can follow the existing ACK/NACK for SPS PDCCH activation/release. For example, PUCCH resources for ACK/NACK feedback may be determined by a transmit power control (TPC) command for the PUCCH field. At block 1004, the UE detects CSI-RS signals according to the identified activated dynamic CSI-RS resources, and, at block 1005, transmits a CSI report based on detected CSI-RS signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure comprises a first aspect, such as a non-transitory computer-readable medium having program code recorded thereon, the program code comprising:

program code for causing a computer to configure a plurality of dynamic channel state information (CSI) reference signal (CSI-RS) resource configurations for each of one or more user equipments (UEs) within a coverage area;

program code for causing the computer to determine a communication activity level related to the one or more UEs;

program code for causing the computer to select one or more CSI-RS resource configurations of the plurality of dynamic CSI-RS resource configurations based on the determined communication activity level;

program code for causing the computer to signal a CSI-RS trigger to each of the one or more UEs via layer 1 signaling, wherein the CSI-RS trigger identifies the selected one or more CSI-RS resource configurations; and program code for causing the computer to transmit CSI-RS according to the selected one or more CSI-RS resource configurations.

Based on the first aspect, the non-transitory computer-readable medium of a second aspect, wherein the program code for causing the computer to transmit the CSI-RS is performed at a first available downlink subframe after the CSI-RS trigger satisfying:

$$\text{first available downlink subframe} = (10*n_f + \text{floor}(n_s/2) - \Delta) \bmod(T),$$

where $n_f$ represents a radio frame number of the first available downlink subframe, $n_s$ represents a slot number of the first available downlink subframe, $\Delta$ represents a subframe offset associated with the selected one or more CSI-RS resource configurations, and T represents a transmission interval associated with the selected one or more CSI-RS resource configurations.

Based on the first aspect, the non-transitory computer-readable medium of a third aspect, wherein the program code for causing the computer to transmit the CSI-RS is transmitted in a subframe located at a subframe offset from another subframe in which the CSI-RS trigger is signaled, wherein the subframe offset is associated with the selected one or more CSI-RS resource configurations, and wherein the CSI-RS is transmitted thereafter at a transmission interval associated with the selected one or more CSI-RS resource configurations.

Based on the first aspect, the non-transitory computer-readable medium of a fourth aspect, wherein the CSI-RS trigger includes a bitmap having a number of bits equal to a number of CSI-RS resource configurations configured in the plurality of dynamic CSI-RS resource configurations, wherein each bit of the bitmap corresponds to a dynamic CSI-RS resource configuration of the plurality of dynamic CSI-RS resource configurations, and wherein a value of each bit signals one of: activation, or release, of the corresponding dynamic CSI-RS resource configuration.

Based on the first aspect, the non-transitory computer-readable medium of a fifth, wherein the CSI-RS trigger includes one of a plurality of triggering states, wherein each of the plurality of triggering states is predefined to identify one or more of:

one or more CSI processes associated with the selected one or more CSI-RS resource configurations, and one or more dynamic CSI-RS resources associated with the one or more CSI processes.

Based on the fifth aspect, the non-transitory computer-readable medium of a sixth aspect, further comprising:

program code for causing the computer to transmit via higher layer signaling identification of the plurality of triggering states to each of the one or more UEs.

Based on the fifth aspect, the non-transitory computer-readable medium of a seventh aspect, wherein each of the plurality of triggering states is further predefined to identify a component carrier on which the CSI-RS associated with the one or more CSI processes and one or more dynamic CSI-RS resources will be transmitted, wherein the identified component carrier is one of a plurality of aggregated component carriers configured for communication with the one or more UEs.

Based on the first aspect, the non-transitory computer-readable medium of an eighth aspect, wherein the CSI-RS trigger includes a carrier indicator field that further identifies a component carrier on which the CSI-RS associated with the selected one or more CSI-RS resource configurations will be transmitted, wherein the identified component carrier is one of a plurality of aggregated component carriers configured for communication with the one or more UEs.

Based on the first aspect, the non-transitory computer-readable medium of a ninth aspect, wherein the layer 1 signaling is a physical downlink control channel (PDCCH), wherein the CSI-RS trigger is signaled on the PDCCH in a first slot of a subframe, and the CSI-RS is transmitted in the second slot of the subframe.

Based on the first aspect, the non-transitory computer-readable medium of a tenth aspect, wherein the layer 1 signaling is one of:
a dedicated DCI to the one or more UEs wherein the CSI-RS trigger is located in a new field of an existing transmission grant; or
a common DCI to the one or more UEs reusing an existing downlink control information (DCI) field scrambled by a temporary identifier and configured for dynamically identifying the selected one or more CSI-RS resource configurations.

Based on the first aspect, the non-transitory computer-readable medium of an eleventh aspect, further including:
program code for causing the computer to identify one or more deactivated dynamic CSI-RS resources of the plurality of dynamic CSI-RS resource configurations to reuse for data transmission;
program code for causing the computer to identify one or more rate matching states corresponding to each of the identified one or more deactivated dynamic CSI-RS resources, wherein each of the one or more rate matching states is associated with a plurality of zero power (ZP) CSI-RS configurations for rate matching;
program code for causing the computer to generate a dynamic indication for one or more served UEs, wherein the dynamic indication identifies which of the identified one or more rate matching states are activated for rate matching;
program code for causing the computer to transmit the dynamic indication to the one or more served UEs; and
program code for causing the computer to transmit the data on the identified one or more deactivated dynamic CSI-RS resources using the identified one or more rate matching states.

Based on the eleventh aspect, the non-transitory computer-readable medium of a twelfth aspect, wherein each of the plurality of ZP CSI-RS configurations includes one or more ZP CSI-RS resources, wherein the one or more ZP CSI-RS resources share a common subframe configuration, and at least one ZP CSI-RS configuration has a different subframe configuration.

Based on the first aspect, the non-transitory computer-readable medium of a thirteenth aspect, including:
program code for causing the computer to identify one or more deactivated dynamic CSI-RS resources of the plurality of dynamic CSI-RS resource configurations to reuse for data transmission; and program code for causing the computer to transmit a plurality of dynamic CSI-RS configurations via a downlink control information (DCI) signal to one or more served UEs within a coverage area, wherein ones of the plurality of dynamic CSI-RS configurations are used for CSI reporting and others of the plurality of dynamic CSI-RS configurations are used for rate matching the one or more deactivated dynamic CSI-RS resource for data transmission.

A fourteenth aspect of the non-transitory computer-readable medium of any combination of the first through thirteenth aspects.

The present disclosure comprises a fifteenth aspect, such as a non-transitory computer-readable medium having program code recorded thereon, the program code comprising:
program code for causing a computer to receive configuration for a plurality of dynamic channel state information (CSI) reference signal (CSI-RS) resource configurations;
program code for causing the computer to receive configuration for CSI reporting for one or more CSI processes;
program code for causing the computer to decode a layer 1 signal identifying activated dynamic CSI-RS resources;
program code for causing the computer to transmit an acknowledgement in response to decoding the layer 1 signal;
program code for causing the computer to detect CSI-RS signals according to the identified activated dynamic CSI-RS resources; and
program code for causing the computer to transmit a CSI report based on detected CSI-RS signals.

Based on the fifteenth aspect, the non-transitory computer-readable medium of a sixteenth aspect, wherein one or more dynamic CSI-RS resources of the identified activated dynamic CSI-RS resources are associated with one or more CSI processes.

Based on the fifteenth aspect, the non-transitory computer-readable medium of a seventeenth aspect, further including:
program code for causing the computer to identify one or more CSI-RS resources associated with a CSI process of the one or more CSI processes are all deactivated;
program code for causing the computer to refrain from transmitting both periodic and aperiodic CSI reports for the CSI process in response to the identifying the one or more CSI-RS resources all deactivated.

Based on the fifteenth aspect, the non-transitory computer-readable medium of an alternative seventeenth aspect, further including:
program code for causing the computer to receive configurations of one or more rate matching states each associated with a plurality of zero power (ZP) CSI-RS configurations;
program code for causing the computer to decode a layer 1 signal identifying one or more rate matching states activated for rate matching; and
program code for causing the computer to receive the data based on the identified one or more activated rate matching states.

An eighteenth aspect of the non-transitory computer-readable medium of any combination of the fifteenth through seventeenth aspects.

The present disclosure comprises a nineteenth aspect, such as an apparatus configured for wireless communication, the apparatus comprising:
at least one processor; and
a memory coupled to the at least one processor,
wherein the at least one processor is configured:
to configure a plurality of dynamic channel state information (CSI) reference signal (CSI-RS) resource configurations for each of one or more user equipments (UEs) within a coverage area;

to determine a communication activity level related to the one or more UEs;

to select one or more CSI-RS resource configurations of the plurality of dynamic CSI-RS resource configurations based on the determined communication activity level;

to signal a CSI-RS trigger to each of the one or more UEs via layer 1 signaling, wherein the CSI-RS trigger identifies the selected one or more CSI-RS resource configurations; and to transmit CSI-RS according to the selected one or more CSI-RS resource configurations.

Based on the nineteenth aspect, the apparatus of a twentieth aspect, wherein the configuration of the at least one processor to transmit the CSI-RS is performed at a first available downlink subframe after the CSI-RS trigger satisfying:

first available downlink subframe=$(10*n_f+\text{floor}(n_s/2)-\Delta)\mod(T)$, where $n_f$ represents a radio frame number of the first available downlink subframe, $n_s$ represents a slot number of the first available downlink subframe, $\Delta$ represents a subframe offset associated with the selected one or more CSI-RS resource configurations, and T represents a transmission interval associated with the selected one or more CSI-RS resource configurations.

Based on the nineteenth aspect, the apparatus of a twenty-first aspect, wherein the configuration of the at least one processor to transmit the CSI-RS is transmitted in a subframe located at a subframe offset from another subframe in which the CSI-RS trigger is signaled, wherein the subframe offset is associated with the selected one or more CSI-RS resource configurations, and wherein the CSI-RS is transmitted thereafter at a transmission interval associated with the selected one or more CSI-RS resource configurations.

Based on the nineteenth aspect, the apparatus of a twenty-second aspect, wherein the CSI-RS trigger includes a bitmap having a number of bits equal to a number of CSI-RS resource configurations configured in the plurality of dynamic CSI-RS resource configurations, wherein each bit of the bitmap corresponds to a dynamic CSI-RS resource configuration of the plurality of dynamic CSI-RS resource configurations, and wherein a value of each bit signals one of: activation, or release, of the corresponding dynamic CSI-RS resource configuration.

Based on the nineteenth aspect, the apparatus of a twenty-third aspect, wherein the CSI-RS trigger includes one of a plurality of triggering states, wherein each of the plurality of triggering states is predefined to identify one or more of:

one or more CSI processes associated with the selected one or more CSI-RS resource configurations, and one or more dynamic CSI-RS resources associated with the one or more CSI processes.

Based on the twenty-third aspect, the apparatus of a twenty-fourth aspect, further comprising configuration of the at least one processor to transmit via higher layer signaling identification of the plurality of triggering states to each of the one or more UEs.

Based on the twenty-third aspect, the apparatus of a twenty-fifth aspect, wherein each of the plurality of triggering states is further predefined to identify a component carrier on which the CSI-RS associated with the one or more CSI processes and one or more dynamic CSI-RS resources will be transmitted, wherein the identified component carrier is one of a plurality of aggregated component carriers configured for communication with the one or more UEs.

Based on the nineteenth aspect, the apparatus of a twenty-sixth aspect, wherein the CSI-RS trigger includes a carrier indicator field that further identifies a component carrier on which the CSI-RS associated with the selected one or more CSI-RS resource configurations will be transmitted, wherein the identified component carrier is one of a plurality of aggregated component carriers configured for communication with the one or more UEs.

Based on the nineteenth aspect, the apparatus of a twenty-seventh aspect, wherein the layer 1 signaling is a physical downlink control channel (PDCCH), wherein the CSI-RS trigger is signaled on the PDCCH in a first slot of a subframe, and the CSI-RS is transmitted in the second slot of the subframe.

Based on the nineteenth aspect, the apparatus of a twenty-eighth aspect, wherein the layer 1 signaling is one of:

a dedicated DCI to the one or more UEs wherein the CSI-RS trigger is located in a new field of an existing transmission grant; or a common DCI to the one or more UEs reusing an existing downlink control information (DCI) field scrambled by a temporary identifier and configured for dynamically identifying the selected one or more CSI-RS resource configurations.

Based on the nineteenth aspect, the apparatus of a twenty-ninth aspect, further including configuration of the at least one processor:

to identify one or more deactivated dynamic CSI-RS resources of the plurality of dynamic CSI-RS resource configurations to reuse for data transmission;

to identify one or more rate matching states corresponding to each of the identified one or more deactivated dynamic CSI-RS resources, wherein each of the one or more rate matching states is associated with a plurality of zero power (ZP) CSI-RS configurations for rate matching;

to generate a dynamic indication for one or more served UEs, wherein the dynamic indication identifies which of the identified one or more rate matching states are activated for rate matching;

to transmit the dynamic indication to the one or more served UEs; and to transmit the data on the identified one or more deactivated dynamic CSI-RS resources using the identified one or more rate matching states.

Based on the twenty-ninth aspect, the apparatus of thirtieth aspect, wherein each of the plurality of ZP CSI-RS configurations includes one or more ZP CSI-RS resources, wherein the one or more ZP CSI-RS resources share a common subframe configuration, and at least one ZP CSI-RS configuration has a different subframe configuration.

Based on the nineteenth aspect, the apparatus of thirty-first aspect, including configuration of the at least one processor:

to identify one or more deactivated dynamic CSI-RS resources of the plurality of dynamic CSI-RS resource configurations to reuse for data transmission; and to transmit a plurality of dynamic CSI-RS configurations via a downlink control information (DCI) signal to one or more served UEs within a coverage area, wherein ones of the plurality of dynamic CSI-RS configurations are used for CSI reporting and others of the plurality of dynamic CSI-RS configurations are used for rate matching the one or more deactivated dynamic CSI-RS resource for data transmission.

A thirty-second aspect of the apparatus of any combination of the nineteenth through thirty-first aspects.

The present disclosure comprises a thirty-third aspect, such as an apparatus configured for wireless communication, the apparatus comprising:

at least one processor; and
a memory coupled to the at least one processor,
wherein the at least one processor is configured:
to receive configuration for a plurality of dynamic channel state information (CSI) reference signal (CSI-RS) resource configurations;
to receive configuration for CSI reporting for one or more CSI processes;
to decode a layer 1 signal identifying activated dynamic CSI-RS resources;
to transmit an acknowledgement in response to decoding the layer 1 signal;
to detect CSI-RS signals according to the identified activated dynamic CSI-RS resources; and
to transmit a CSI report based on detected CSI-RS signals.

Based on the thirty-third aspect, the apparatus of a thirty-fourth aspect, wherein one or more dynamic CSI-RS resources of the identified activated dynamic CSI-RS resources are associated with one or more CSI processes.

Based on the thirty-third aspect, the apparatus of a thirty-fifth aspect, further including configuration of the at least one processor:

to identify one or more CSI-RS resources associated with a CSI process of the one or more CSI processes are all deactivated;
to refrain from transmitting both periodic and aperiodic CSI reports for the CSI process in response to the identifying the one or more CSI-RS resources all deactivated.

Based on the thirty-third aspect, the apparatus of an alternative thirty-fifth aspect, further including configuration of the at least one processor:

to receive configurations of one or more rate matching states each associated with plurality of zero power (ZP) CSI-RS configurations;
to decode a layer 1 signal identifying one or more rate matching states are activated for rate matching; and
to receive the data based on the identified one or more activated rate matching states.

A thirty-sixth aspect of the apparatus of any combination of the thirty-third through thirty-fifth aspects.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media, includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
configuring a plurality of dynamic channel state information (CSI) reference signal (CSI-RS) resource configurations for each of one or more user equipments (UEs) within a coverage area;
determining a communication activity level related to the one or more UEs;
selecting one or more CSI-RS resource configurations of the plurality of dynamic CSI-RS resource configurations based on the determined communication activity level;
signaling a CSI-RS trigger to each of the one or more UEs via layer 1 signaling, wherein the CSI-RS trigger identifies the selected one or more CSI-RS resource configurations;
transmitting CSI-RS according to the selected one or more CSI-RS resource configurations;
identifying one or more deactivated dynamic CSI-RS resources of the plurality of dynamic CSI-RS resource configurations to reuse for data transmission;
identifying one or more rate matching states corresponding to each of the identified one or more deactivated dynamic CSI-RS resources;
generating a dynamic indication for one or more served UEs, wherein the dynamic indication identifies which of the identified one or more rate matching states are activated for rate matching;
transmitting the dynamic indication to the one or more served UEs; and
transmitting the data on the identified one or more deactivated dynamic CSI-RS resources using the identified one or more rate matching states.

2. The method of claim 1, wherein the transmitting the CSI-RS is performed at a first available downlink subframe after the CSI-RS trigger satisfying:

$$\text{first available downlink subframe} = (10*n_f + \text{floor}(n_s/2) - \Delta) \mod(T),$$

where $n_f$ represents a radio frame number of the first available downlink subframe, $n_s$ represents a slot number of the first available downlink subframe, $\Delta$ represents a subframe offset associated with the selected one or more CSI-RS resource configurations, and T represents a transmission interval associated with the selected one or more CSI-RS resource configurations.

3. The method of claim 1, wherein the transmitting the CSI-RS is transmitted in a subframe located at a subframe offset from another subframe in which the CSI-RS trigger is signaled, wherein the subframe offset is associated with the selected one or more CSI-RS resource configurations, and wherein the CSI-RS is transmitted thereafter at a transmission interval associated with the selected one or more CSI-RS resource configurations.

4. The method of claim 1, wherein the CSI-RS trigger includes a bitmap having a number of bits equal to a number of CSI-RS resource configurations configured in the plurality of dynamic CSI-RS resource configurations, wherein each bit of the bitmap corresponds to a dynamic CSI-RS resource configuration of the plurality of dynamic CSI-RS resource configurations, and wherein a value of each bit signals one of: activation, or release, of the corresponding dynamic CSI-RS resource configuration.

5. The method of claim 1, wherein the CSI-RS trigger includes one of a plurality of triggering states, wherein each of the plurality of triggering states is predefined to identify one or more of:
one or more CSI processes associated with the selected one or more CSI-RS resource configurations, and
one or more dynamic CSI-RS resources associated with the one or more CSI processes.

6. The method of claim 5, further comprising:
transmitting via higher layer signaling identification of the plurality of triggering states to each of the one or more UEs.

7. The method of claim 5, wherein each of the plurality of triggering states is further predefined to identify a component carrier on which the CSI-RS associated with the one or more CSI processes and one or more dynamic CSI-RS resources will be transmitted, wherein the identified component carrier is one of a plurality of aggregated component carriers configured for communication with the one or more UEs.

8. The method of claim 1, wherein the CSI-RS trigger includes a carrier indicator field that further identifies a component carrier on which the CSI-RS associated with the selected one or more CSI-RS resource configurations will be transmitted, wherein the identified component carrier is one of a plurality of aggregated component carriers configured for communication with the one or more UEs.

9. The method of claim 1, wherein the layer 1 signaling is a physical downlink control channel (PDCCH), wherein the CSI-RS trigger is signaled on the PDCCH in a first slot of a subframe, and the CSI-RS is transmitted in a second slot of the subframe.

10. The method of claim 1, wherein the layer 1 signaling is one of:
a dedicated DCI to the one or more UEs wherein the CSI-RS trigger is located in a new field of an existing transmission grant; or
a common DCI to the one or more UEs reusing an existing downlink control information (DCI) field scrambled by a temporary identifier and configured for dynamically identifying the selected one or more CSI-RS resource configurations.

11. The method of claim 1, including:
identifying one or more deactivated dynamic CSI-RS resources of the plurality of dynamic CSI-RS resource configurations to reuse for data transmission; and
transmitting a plurality of dynamic CSI-RS configurations via a downlink control information (DCI) signal to one or more served UEs within a coverage area, wherein ones of the plurality of dynamic CSI-RS configurations are used for CSI reporting and others of the plurality of dynamic CSI-RS configurations are used for rate matching the one or more deactivated dynamic CSI-RS resource for data transmission.

12. The method of claim 1, wherein determining the communication activity level related to the one or more UEs comprises monitoring traffic corresponding to the one or more UEs.

13. The method of claim 1, wherein determining the communication activity level related to the one or more UEs comprises monitoring data stored in downlink queues for the one or more UEs.

14. The method of claim 1, wherein each of the one or more rate matching states is associated with a plurality of zero power (ZP) CSI-RS configurations for rate matching.

15. The method of claim 14, wherein each of the plurality of ZP CSI-RS configurations includes one or more ZP CSI-RS resources, wherein the one or more ZP CSI-RS resources share a common subframe configuration, and at least one ZP CSI-RS configuration has a different subframe configuration.

16. A method of wireless communication, comprising:
receiving configuration for a plurality of dynamic channel state information (CSI) reference signal (CSI-RS) resource configurations;
receiving configuration for CSI reporting for one or more CSI processes;
decoding a layer 1 signal identifying activated dynamic CSI-RS resources;
transmitting an acknowledgement in response to decoding the layer 1 signal;
detecting CSI-RS signals according to the identified activated dynamic CSI-RS resources;
transmitting a CSI report based on detected CSI-RS signals;
receiving a dynamic indication identifying one or more rate matching states that are activated for rate matching, the one or more rate matching states corresponding to one of more deactivated dynamic CSI-RS resource configurations and associated with a plurality of CSI-RS configurations for rate matching; and
receiving data on the identified one or more deactivated dynamic CSI-RS resources using the identified one or more rate matching states.

17. The method of claim 16, wherein one or more dynamic CSI-RS resources of the identified activated dynamic CSI-RS resources are associated with one or more CSI processes.

18. The method of claim 16, further including:
identifying one or more CSI-RS resources associated with a CSI process of the one or more CSI processes are all deactivated; and
refraining from transmitting both periodic and aperiodic CSI reports for the CSI process in response to the identifying the one or more CSI-RS resources all deactivated.

19. The method of claim 16, further including:
receiving configurations of one or more rate matching states each associated with a plurality of zero power (ZP) CSI-RS configurations;
decoding a layer 1 signal identifying one or more rate matching states activated for rate matching; and
receiving the data based on the identified one or more activated rate matching states.

20. An apparatus configured for wireless communication, comprising:
means for configuring a plurality of dynamic channel state information (CSI) reference signal (CSI-RS) resource configurations for each of one or more user equipments (UEs) within a coverage area;
means for determining a communication activity level related to the one or more UEs;
means for selecting one or more CSI-RS resource configurations of the plurality of dynamic CSI-RS resource configurations based on the determined communication activity level;
means for signaling a CSI-RS trigger to each of the one or more UEs via layer 1 signaling, wherein the CSI-RS trigger identifies the selected one or more CSI-RS resource configurations;
means for transmitting CSI-RS according to the selected one or more CSI-RS resource configurations;
means for identifying one or more deactivated dynamic CSI-RS resources of the plurality of dynamic CSI-RS resource configurations to reuse for data transmission;
means for identifying one or more rate matching states corresponding to each of the identified one or more deactivated dynamic CSI-RS resources;
means for generating a dynamic indication for one or more served UEs, wherein the dynamic indication identifies which of the identified one or more rate matching states are activated for rate matching;
means for transmitting the dynamic indication to the one or more served UEs; and
means for transmitting the data on the identified one or more deactivated dynamic CSI-RS resources using the identified one or more rate matching states.

21. The apparatus of claim 20, wherein the means for transmitting the CSI-RS is performed at a first available downlink subframe after the CSI-RS trigger satisfying:

$$\text{first available downlink subframe} = (10 * n_f + \text{floor}(n_s/2) - \Delta) \bmod(T),$$

where $n_f$ represents a radio frame number of the first available downlink subframe, $n_s$ represents a slot number of the first available downlink subframe, $\Delta$ represents a subframe offset associated with the selected one or more CSI-RS resource configurations, and T represents a transmission interval associated with the selected one or more CSI-RS resource configurations.

22. The apparatus of claim 20, wherein the means for transmitting the CSI-RS is transmitted in a subframe located at a subframe offset from a prior subframe in which the CSI-RS trigger is signaled, wherein the subframe offset is associated with the selected one or more CSI-RS resource configurations, and wherein the CSI-RS is transmitted thereafter at a transmission interval associated with the selected one or more CSI-RS resource configurations.

23. The apparatus of claim 20, wherein the CSI-RS trigger includes a bitmap having a number of bits equal to a number of CSI-RS resource configurations configured in the plurality of dynamic CSI-RS resource configurations, wherein each bit of the bitmap corresponds to a dynamic CSI-RS resource configuration of the plurality of dynamic CSI-RS resource configurations, and wherein a value of each bit signals one of: activation, or release, of the corresponding dynamic CSI-RS resource configuration.

24. The apparatus of claim 20, wherein the CSI-RS trigger includes a carrier indicator field that further identifies a component carrier on which the CSI-RS associated with the selected one or more CSI-RS resource configurations will be transmitted, wherein the identified component carrier is one of a plurality of aggregated component carriers configured for communication with the one or more UEs.

25. The apparatus of claim 20, wherein the CSI-RS trigger is one of:
   located in a new field of an existing transmission grant of the layer 1 signaling, wherein the layer 1 signaling is one of: a physical downlink control channel (PDCCH) or enhanced downlink control channel (EPDCCH); or
   reusing an existing downlink control information (DCI) field in the existing transmission grant scrambled by a temporary identifier assigned to the one or more UEs and configured for dynamically identifying the selected one or more CSI-RS resource configurations.

26. The apparatus of claim 20, including:
   means for identifying one or more deactivated dynamic CSI-RS resources of the plurality of dynamic CSI-RS resource configurations to reuse for data transmission; and
   means for transmitting a plurality of dynamic CSI-RS configurations via a downlink control information (DCI) signal to one or more served UEs within a coverage area, wherein ones of the plurality of dynamic CSI-RS configurations are used for CSI reporting and others of the plurality of dynamic CSI-RS configurations are used for rate matching the one or more deactivated dynamic CSI-RS resource for data transmission.

27. An apparatus configured for wireless communication, comprising:
   means for receiving configuration for a plurality of dynamic channel state information (CSI) reference signal (CSI-RS) resource configurations;
   means for receiving configuration for CSI reporting for one or more CSI processes;
   means for decoding a layer 1 signal identifying activated dynamic CSI-RS resources;
   means for transmitting an acknowledgement in response to decoding the layer 1 signal;
   means for detecting CSI-RS signals according to the identified activated dynamic CSI-RS resources;
   means for transmitting a CSI report based on detected CSI-RS signals;
   means for receiving a dynamic indication identifying one or more rate matching states that are activated for rate matching, the one or more rate matching states corresponding to one of more deactivated dynamic CSI-RS resource configurations and associated with a plurality of CSI-RS configurations for rate matching; and
   means for receiving data on the identified one or more deactivated dynamic CSI-RS resources using the identified one or more rate matching states.

28. The apparatus of claim 27, further including:
   means for receiving configurations of one or more rate matching states each associated with a plurality of zero power (ZP) CSI-RS configurations;
   means for decoding a layer 1 signal identifying one or more rate matching states activated for rate matching; and
   means for receiving the data based on the identified one or more activated rate matching states.

* * * * *